US 9,963,919 B2

(12) United States Patent
Sugiura et al.

(10) Patent No.: US 9,963,919 B2
(45) Date of Patent: May 8, 2018

(54) LOCKING DEVICE

(71) Applicant: SHIROKI CORPORATION, Fujisawa-shi (JP)

(72) Inventors: Saiki Sugiura, Fujisawa (JP); Hiroyuki Suzuki, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 67 days.

(21) Appl. No.: 14/772,879

(22) PCT Filed: Mar. 3, 2014

(86) PCT No.: PCT/JP2014/055253
§ 371 (c)(1),
(2) Date: Sep. 4, 2015

(87) PCT Pub. No.: WO2014/136713
PCT Pub. Date: Sep. 12, 2014

(65) Prior Publication Data
US 2016/0010370 A1    Jan. 14, 2016

(30) Foreign Application Priority Data

Mar. 7, 2013 (JP) .................................. 2013-045004

(51) Int. Cl.
*E05C 3/06* (2006.01)
*E05C 3/30* (2006.01)
(Continued)

(52) U.S. Cl.
CPC ............ *E05C 3/30* (2013.01); *B60N 2/01583* (2013.01); *E05B 85/26* (2013.01); *E05C 3/002* (2013.01);
(Continued)

(58) Field of Classification Search
CPC ......... Y10T 292/1043; Y10T 292/1047; Y10T 292/1078; B60N 2/01516; B60N 2/01541;
(Continued)

(56) References Cited

U.S. PATENT DOCUMENTS 6,945,585 B1 *   9/2005   Liu ................... B60N 2/01583
                                                292/216
7,959,205 B2 *   6/2011   Paing ................ B60N 2/01583
                                                296/65.03
(Continued)

FOREIGN PATENT DOCUMENTS

JP        S 57-34292 Y2      7/1982
JP        4862615 B2          1/2012
WO        WO 2013120185 A9 *  2/2014   ............. E05B 77/38

OTHER PUBLICATIONS

International Search Report (ISR) (PCT Form PCT/ISA/210), in PCT/JP2014/055253, dated May 20, 2014.

*Primary Examiner* — Alyson M Merlino
(74) *Attorney, Agent, or Firm* — McGinn IP Law Group, PLLC

(57) ABSTRACT

A locking device provided with: a striker-contact member (201) which is positioned on a hook (157) and is abutted against a striker being entered the groove (157*a*) of the hook (157) so as to sandwich the striker in cooperation with the groove (157*a*) of the hook (157); and a spring (hook-biasing member) (171) that urges the hook (157) in the unlocked position direction via the striker-contact member (201) and that urges the striker-contact member (201) in a direction a direction to be abutted against the striker.

12 Claims, 9 Drawing Sheets

(51) Int. Cl.
  *B60N 2/015*   (2006.01)
  *E05B 85/26*   (2014.01)
  *E05C 3/00*    (2006.01)
  *E05C 3/12*    (2006.01)
  *B60N 2/02*    (2006.01)
  *E05B 77/38*   (2014.01)
  *E05B 15/04*   (2006.01)

(52) U.S. Cl.
  CPC .............. *E05C 3/124* (2013.01); *E05B 77/38* (2013.01); *E05B 2015/042* (2013.01)

(58) Field of Classification Search
  CPC ........................... B60N 2/0155; B60N 2/2245; B60N 2/01583; B60N 2/305; E05B 77/36; E05B 77/38; E05B 85/20; E05B 85/24; E05B 85/26; E05C 3/20; E05C 3/124; E05C 3/30; E05C 3/002
  USPC ................. 297/336, 378.11, 378.12, 378.13; 296/65.03, 65.16, 65.17
  See application file for complete search history.

(56) References Cited

U.S. PATENT DOCUMENTS

| | | | |
|---|---|---|---|
| 8,128,135 B2* | 3/2012 | Maeta | B60N 2/01583 292/216 |
| 2010/0026013 A1* | 2/2010 | Otsuka | B60N 2/01583 292/121 |
| 2010/0032967 A1* | 2/2010 | Otsuka | B60N 2/01583 292/240 |
| 2013/0129413 A1* | 5/2013 | Dryburgh | B60N 2/01583 403/316 |

* cited by examiner

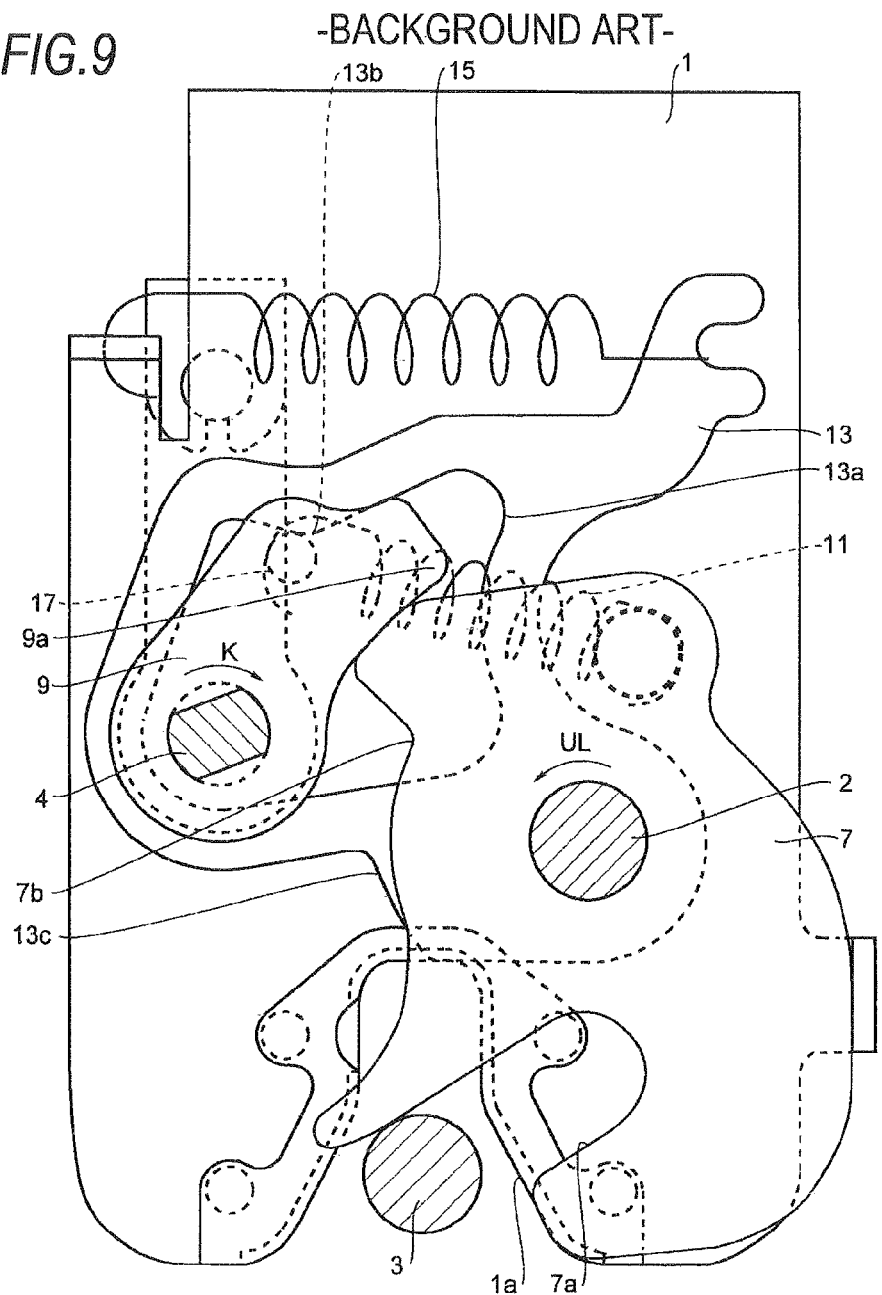
FIG.9 -BACKGROUND ART-

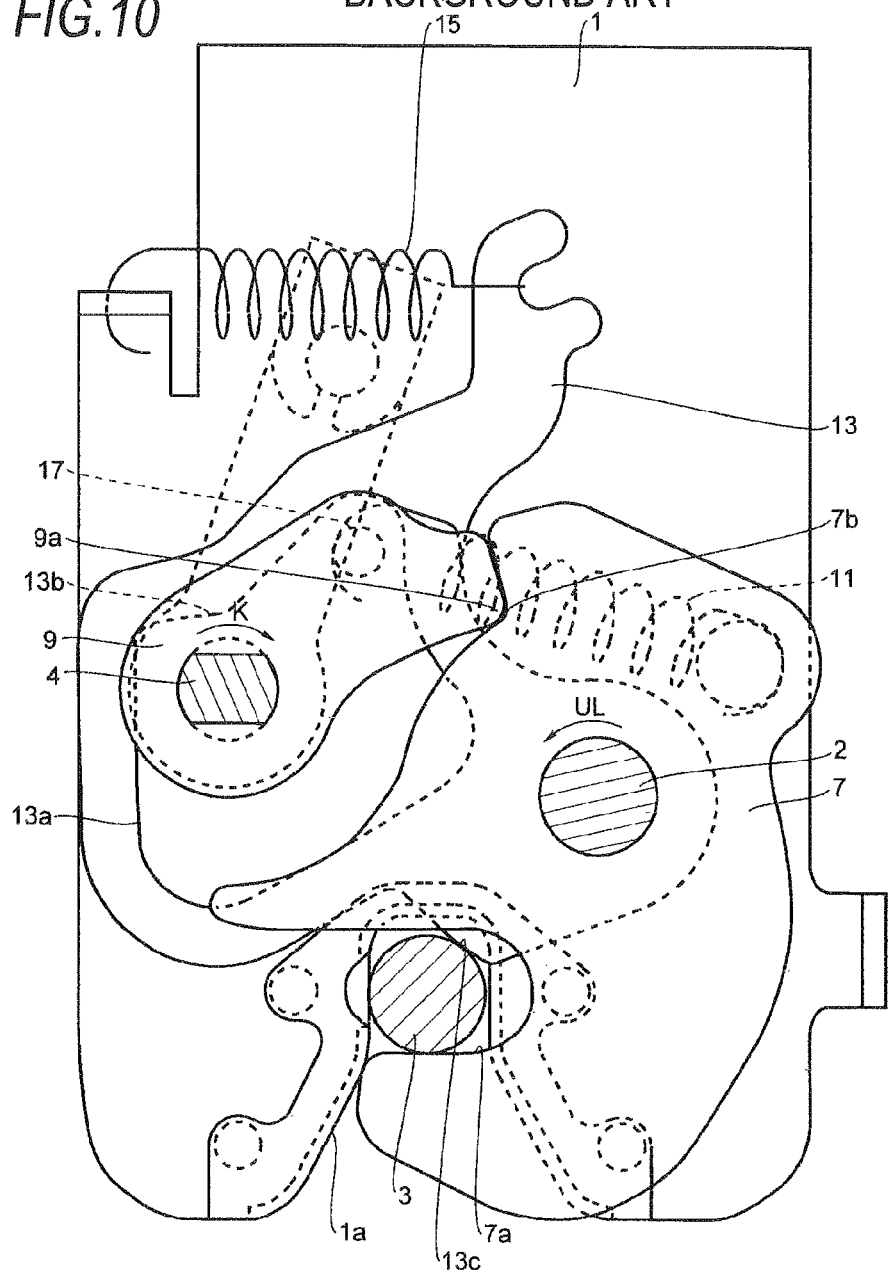

LOCKING DEVICE

TECHNICAL FIELD

The present invention relates to a locking device.

BACKGROUND ART

An example of a background locking device is described with reference to FIGS. 9 and 10. FIG. 9 is a view for explaining an unlocked state of the background locking device. FIG. 10 is a view for explaining a locked state of the background locking device.

The locking device is attached to each of a moving-side member and a fixed-side member. In these figures, the moving-side member is, for example, a seat, a door, a trunk lid or an engine hood, which is provided to be rotatable relative to a floor of a vehicle. The fixed-side member is, for example, a vehicle body. The locking device is a device that is capable of preventing the relative movement between the moving-side member and the fixed-side member (e.g., see Patent Literature 1).

The locking device includes a base 1 and a striker 3. The base 1 is provided in one of the moving-side member and the fixed-side member, and the striker 3 is provided in the other one.

A shaft 2 is provided on the right portion of the base 1, and a hook 7 is rotatably provided on the shaft 2. A shaft 4 is rotatably provided on the left portion of the base 1, and a pawl 9 is provided on the shaft 4. A groove 1a is provided between the left portion and the right portion of the base 1.

The hook 7 is formed with a groove 7a into which the striker 3 is capable of entering. The hook 7 is formed with a concave portion 7b. The pawl 9 is formed with a convex portion 9a which is engageable with the concave portion 7b of the hook 7.

A spring 11 is caused to exert a force on the hook 7 and the pawl 9. One end of the spring 11 is locked to the hook 7 and the other end thereof is locked to the pawl 9. The spring 11 urges the hook 7 in an unlocked position direction (in the drawing, a direction of an arrow UL) and urges the pawl 9 in a direction (in the drawing, a direction of an arrow K) in which the convex portion 9a is engaged with the concave portion 7b of the hook 7.

A striker-contact member 13 is rotatably provided on the shaft 2 of the hook 7. One end of a spring 15 is locked to the base 1, and the other end thereof is locked to the striker-contact member 13. The spring 15 urges the striker-contact member 13 in the same direction as the unlock direction (in the drawing, the direction of the arrow UL) of the hook 7. The striker-contact member 13 is formed with a cam hole 13a.

The pawl 9 is provided with a pin 17 which is fitted into the cam hole 13a of the striker-contact member 13.

As shown in FIG. 10, a stopper portion 13b is formed in the cam hole 13a of the striker-contact member 13, and the pin 17 of the pawl 9 is capable of abutting against the stopper portion 13b.

The striker-contact member 13 is formed with a contact portion 13c, which is abutted against the striker 3 so as to sandwich the striker 3 in cooperation with a wall surface of the groove 7a of the hook 7 and a wall surface of the groove 1a of the base 1.

Next, an operation of the locking device configured as described above is described.

In the unlocked state shown in FIG. 9, the stopper portion 13b of the cam hole 13a of the striker-contact member 13 is abutted against the pin 17 of the pawl 9, and thus the striker-contact member 13 is prohibited from being further rotated in the direction of the arrow UL.

When a surface in the vicinity of an opening of the groove 7a of the hook 7 is pressed by the striker 3, the hook 7 is rotated in a locked position direction against an urging force of the spring 11. Then, the concave portion 7b of the hook 7 is engaged with the convex portion 9a of the pawl 9, so that the hook 7 is prohibited from being rotated in the unlock direction. In this way, the striker 3 becomes the locked state shown in FIG. 10, in which the striker 3 cannot be detached from the groove 7a of the hook 7.

When the convex portion 9a of the pawl 9 is engaged with the concave portion 7b of the hook 7, the pawl 9 is rotated in a direction of an arrow K. In this way, the abutment between the pin 17 of the pawl 9 and the stopper portion 13b of the cam hole 13a of the striker-contact member 13 is released. Further, the striker-contact member 13 is rotated in the direction of the arrow UL by an urging force of the spring 15. Then, the contact portion 13c of the striker-contact member 13 sandwiches the striker 3 in cooperation with the wall surface of the groove 7a of the hook 7 and the wall surface of the groove 1a of the base 1. In this way, the rattling between the striker 3 and the groove 7a of the hook 7 is eliminated.

On the contrary, in order to unlock the locked state shown in FIG. 10, the pawl 9 is rotated in a direction opposite to the direction of the arrow K against the urging force of the spring 11 and the spring 15. Then, the engagement between the convex portion 9a of the pawl 9 and the concave portion 7b of the hook 7 is released and the urging force of the spring 11 causes the hook 7 to be rotated to the unlocked position where the striker 3 is capable of entering the groove 7a. When a rotation operating force to the pawl 9 is released in this state, the convex portion 9a of the pawl 9 becomes the unlocked state shown in FIG. 9 by being abutted against the portion of the hook 7 other than the concave portion 7a.

The pin 17 is also moved by the movement of the pawl 9, and the stopper portion 13b of the cam hole 13a of the striker-contact member 13 comes to push the pin 17.

CITATION LIST

Patent Literature

Patent Literature 1: Japanese Patent Publication No. 4862615

DISCLOSURE OF INVENTION

Problems to be Solved by Invention

In the locking device configured as described above, when unlocking the locked state, the pawl 9 has to be rotated against the urging force of two springs of the spring 11 for urging the pawl 9 and the spring 15 for urging the striker-contact member 13. Accordingly, a large operating force is required at the time of unlocking the locked state.

Further, the pin 17 is moved while being abutted against the cam hole 13a at the time of unlocking the locked state. Therefore, an operating force is varied and operability is poor.

The present invention has been made in consideration of the above problems, and an object thereof is to provide a locking device in which an operating force at the time of unlocking the locked state is reduced and which has a good operability.

Means for Solving the Problems

According to the present invention, there is provided a locking device that includes a base; a hook, which is provided on the base and is formed with a groove into which a striker is capable of entering and which is capable of rotating from an unlocked position where the striker is capable of entering the groove to a locked position where the striker is prohibited from being detached from the groove; a pawl, which is rotatably provided on the base and configured to prohibit the rotation of the hook by being engaged with the hook located in the locked position and which is urged in a direction to be engaged with the hook; a striker-contact member, which is provided on the hook and is abutted against the striker so as to sandwich the striker being entered the groove of the hook, in cooperation with the groove of the hook; and an urging member, which urges the hook in the unlocked position direction via the striker-contact member and urges the striker-contact member in a direction to be abutted against the striker.

Effects of Invention

According to the present invention, a locking device is provided, in which an operating force at the time of unlocking the locked state is reduced and which has a good operability.

Other effects of the present invention become more apparent from the embodiment for carrying out the invention described below and accompanying drawings.

BRIEF DESCRIPTION OF DRAWINGS

FIG. 9 is a view for explaining an unlocked state of a background locking device.

FIG. 10 is a view for explaining a locked state of the background locking device.

EMBODIMENT FOR CARRYING OUT INVENTION

Figure 1:
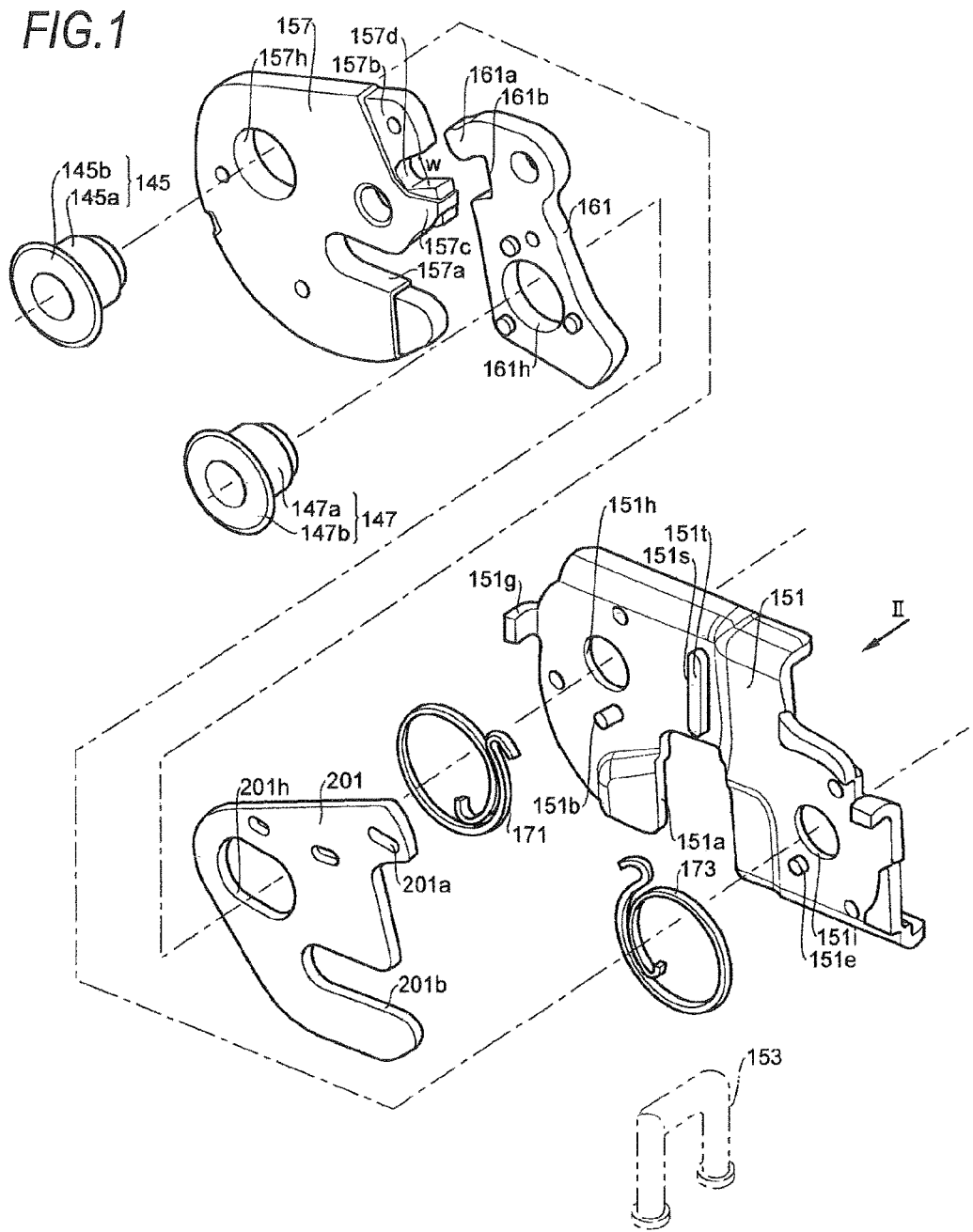
FIG. 1 is an exploded perspective view of a locking device of an illustrative embodiment.
Figure 2:
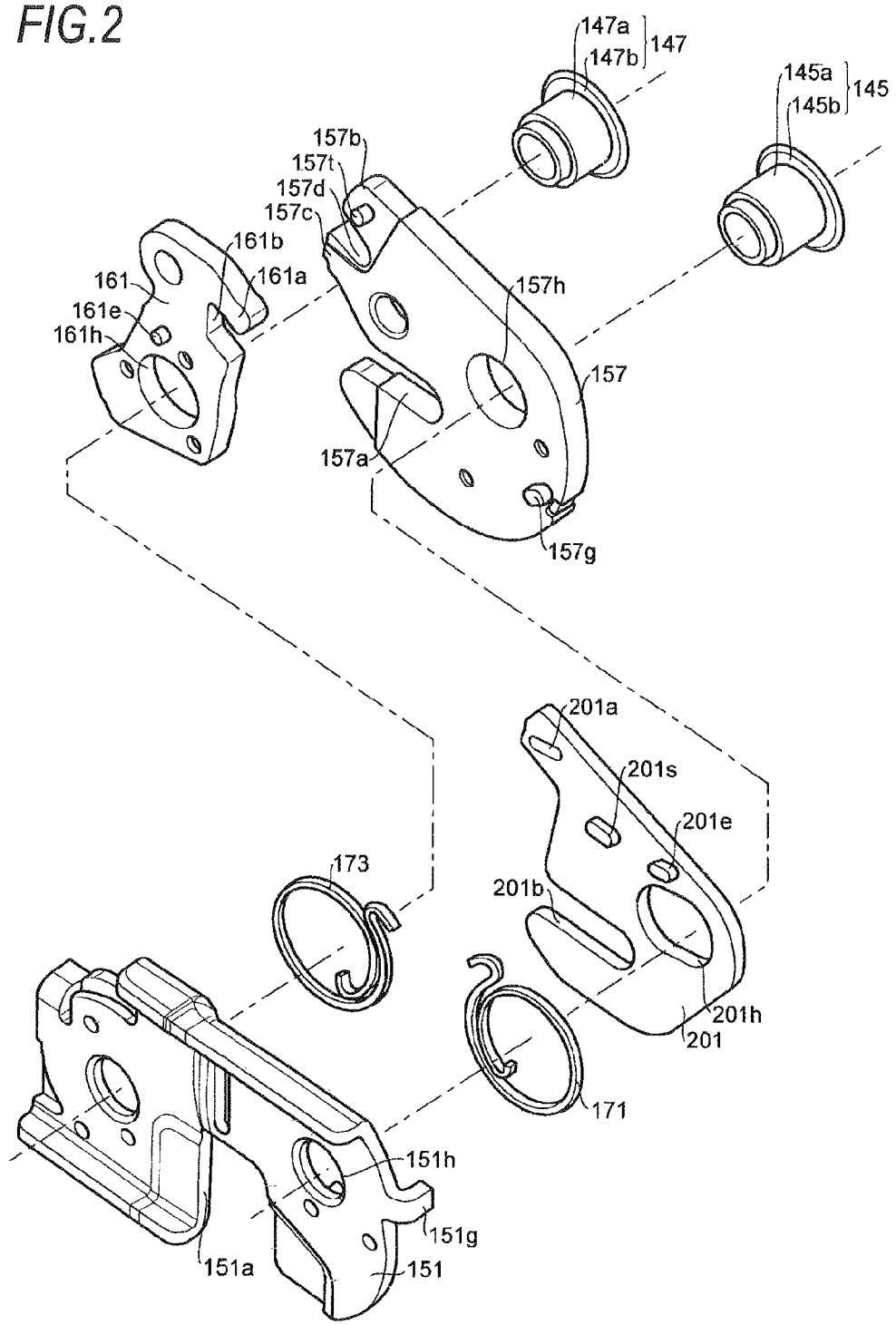
FIG. 2 is an exploded perspective view as seen from a direction of an arrow II in FIG. 1.
Figure 3:
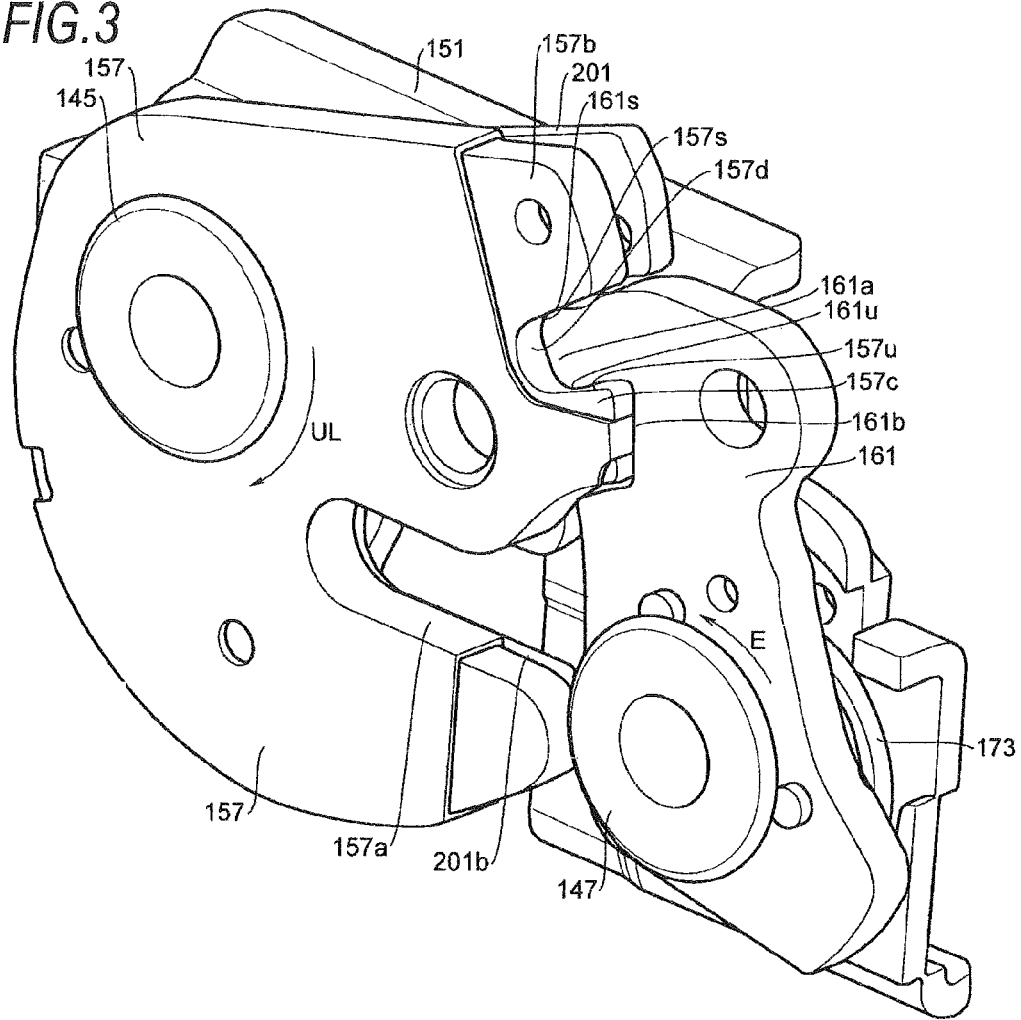
FIG. 3 is a perspective view showing an assembled state of the locking device shown in FIG. 1.
Figure 4:
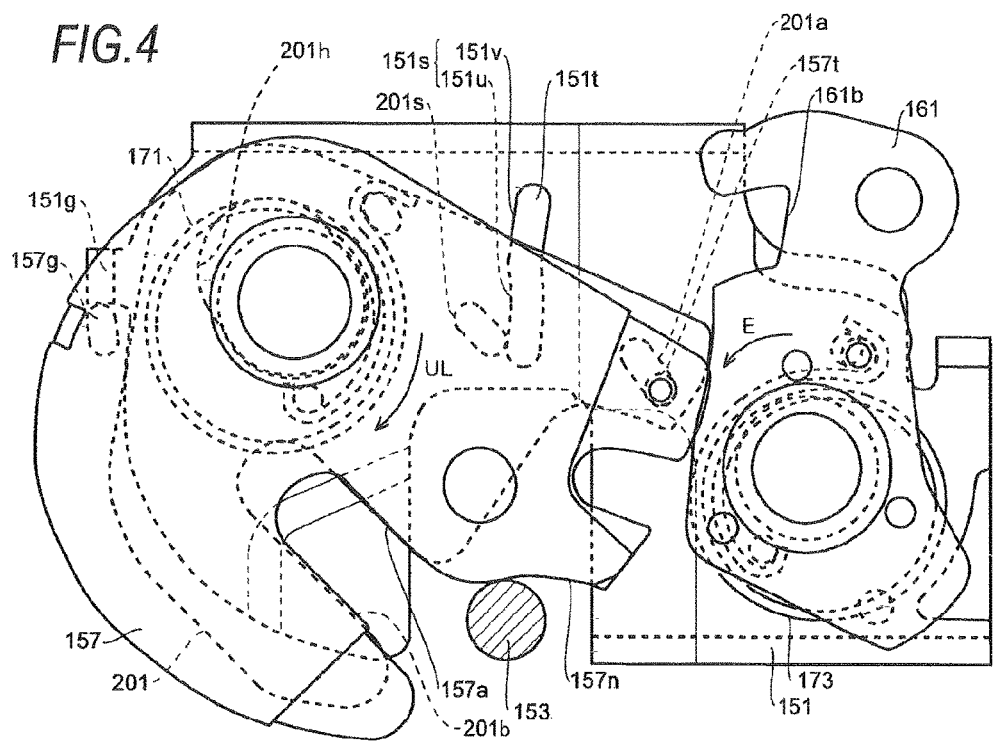
FIG. 4 is a plan view for explaining an unlocked state (fully open) of the locking device shown in FIG. 1.
Figure 5:
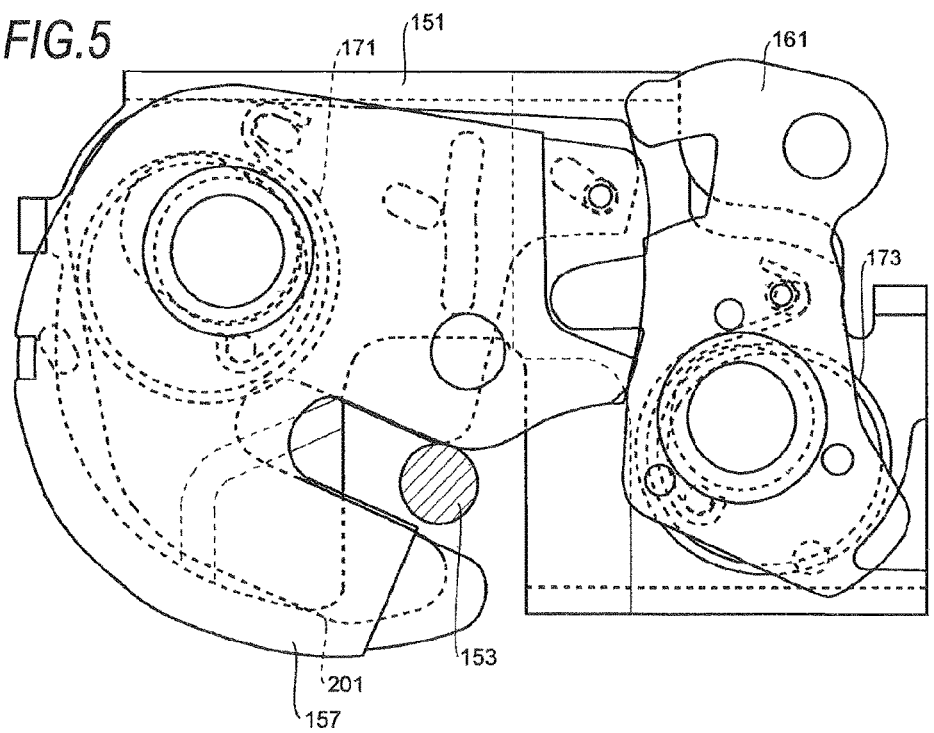
FIG. 5 is a plan view for explaining a state between an unlocked state and a locked state of the locking device shown in FIG. 1.
Figure 6:
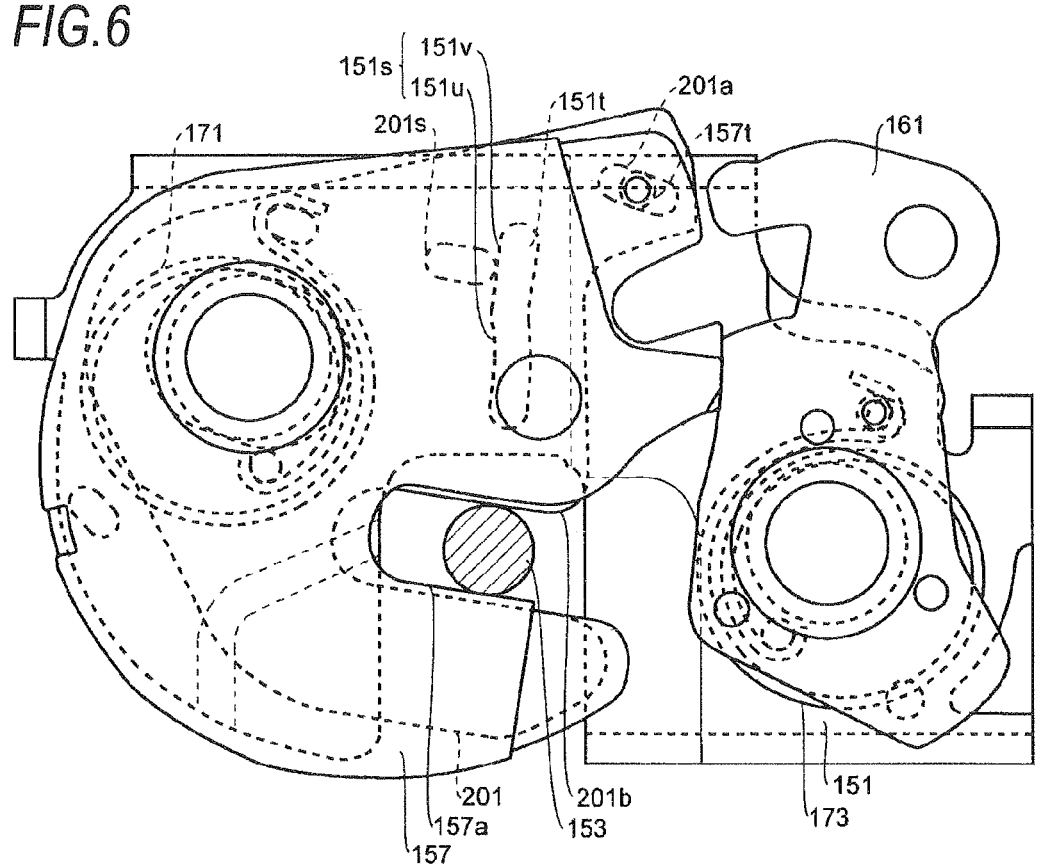
FIG. 6 is a plan view for explaining a state that is further shifted to the locked state from the state of FIG. 5.
Figure 7:
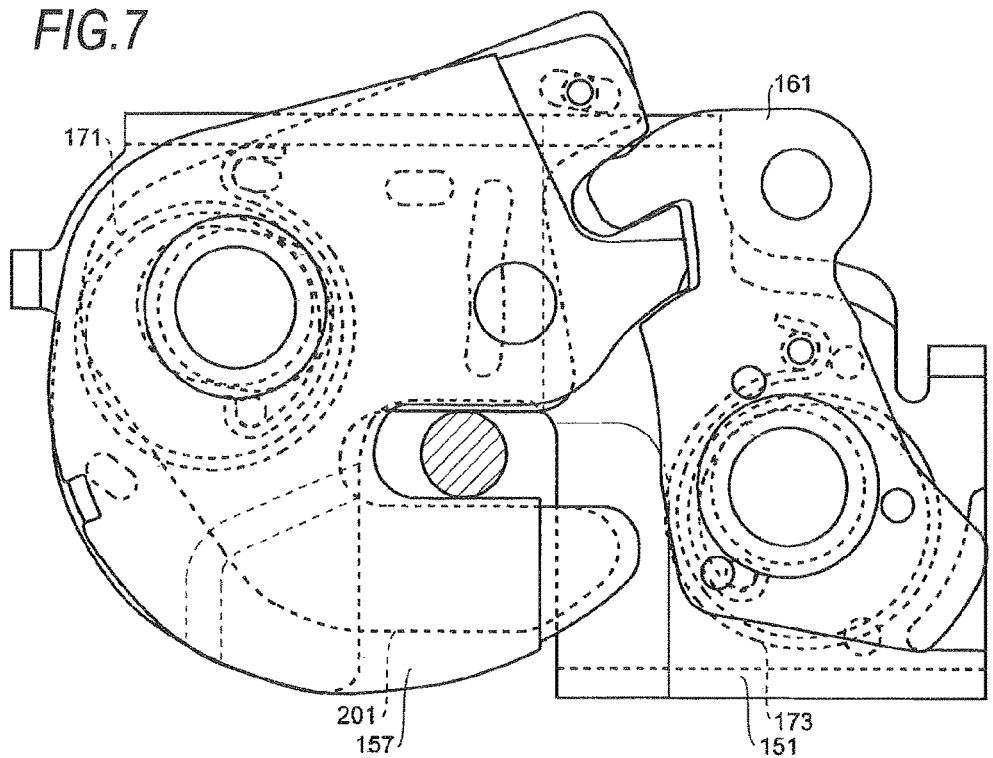
FIG. 7 is a plan view for explaining the locked state of the locking device shown in FIG. 1.
Figure 8:
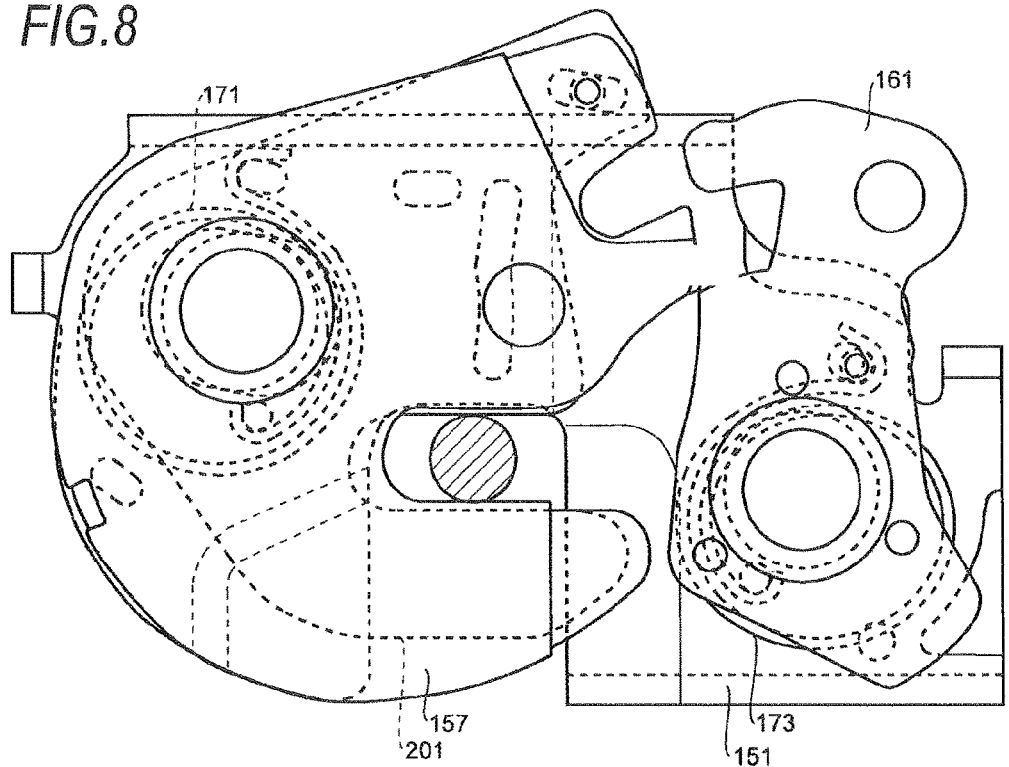
FIG. 8 is a plan view for explaining a state of the locking device shown in FIG. 1 immediately after the locked state is unlocked.

An illustrative embodiment of the present invention will be described with reference to the drawings. FIG. 1 is an exploded perspective view of a locking device of an illustrative embodiment, FIG. 2 is an exploded perspective view as seen from a direction of an arrow II in FIG. 1, FIG. 3 is a perspective view showing an assembled state of the locking device shown in FIG. 1, FIG. 4 is a plan view for explaining an unlocked state (fully open) of the locking device shown in FIG. 1, FIG. 5 is a plan view for explaining a state between an unlocked state and a locked state of the locking device shown in FIG. 1, FIG. 6 is a plan view for explaining a state that is further shifted to the locked state from the state of FIG. 5, FIG. 7 is a plan view for explaining the locked state of the locking device shown in FIG. 1, and FIG. 8 is a plan view for explaining a state of the locking device shown in FIG. 1 immediately after the locked state is unlocked.

First, a configuration of a locking device of the present embodiment is described with reference to FIGS. 1 to 3.

The locking device is attached to each of a moving-side member and a fixed-side member. The moving-side member is, for example, a seat, a door, a trunk lid or an engine hood, which is provided to be rotatable relative to a floor of a vehicle. The fixed-side member is, for example, a vehicle body. The locking device is a device that is capable of preventing the relative movement between the moving-side member and the fixed-side member.

The locking device includes a base 151 and a striker 153. The base 151 is attached to one of the moving-side member and the fixed-side member, and the striker 153 is attached to the other of the moving-side member and the fixed-side member.

The base 151 is provided with a groove 151a into which the striker 153 is capable of entering. The base 151 includes a hook 157 and a pawl 161. The hook 157 and the pawl 161 are provided on the base 151 so as to be rotatable around rotation axes parallel to each other.

As shown in FIG. 1, the base 151 is a substantially plate-like member having a front surface and a back surface. The base 151 has a right portion and a left portion, which are provided across the groove 151a.

On the front surface of the left portion of the base 151, a striker-contact member 201, and a hook 157 are stacked in this order from the base 151 side. The striker-contact member 201 is provided with an elongated through hole 201h that has a track shape. The hook 157 is provided with a circular through hole 157h. The base 151 is also formed with a through hole 151h. A diameter of the hole 151h, a short diameter of the elongated hole 201h of the striker-contact member 201 and a diameter of the hole 157h of the hook 157 are set to be approximately the same size, respectively.

A bushing 145 is provided on the front surface of the base 151. The bushing 145 has a cylindrical portion 145a and an attaching portion 145b formed in a base portion of the cylindrical portion 145a. The cylindrical portion 145a is inserted into the hole 157h of the hook 157, the elongated hole 201h of the striker-contact member 201 and the hole 151h of the base 151. The attaching portion 145b is abutted against a peripheral edge of the hole 157h of the hook 157.

An outer diameter of the cylindrical portion 145a is set to be slightly smaller than the diameter of the hole 157h of the hook 157, the short diameter of the elongated hole 201h of the striker-contact member 201 and the diameter of the hole 151h of the base 151. The cylindrical portion 145a is inserted through the hole 151h of the base 151 and projected to the back surface of the base 151. A leading end of the cylindrical portion 145a is crimped at the back surface of the base 151. The hook 157 and the striker-contact member 201 are rotatable relative to the base 151.

Further, in the present embodiment, the position of the hook 157 shown in FIG. 4 is defined as an unlocked position and the position of the hook 157 shown in FIG. 7 is defined as a locked position.

As shown in FIG. 1, the pawl 161 is arranged on the front surface of the right portion of the base 151. The pawl 161 is formed with a through hole 161h. Furthermore, the base 151 is also formed with a through hole 151i. A diameter of the hole 151i is set to be substantially equal to that of the hole 161h of the pawl 161.

A bushing 147 is provided on the front surface of the base 151. The bushing 147 has a cylindrical portion 147a and an attaching portion 147b formed in a base portion of the cylindrical portion 147a. The cylindrical portion 147a is inserted into the hole 161h of the pawl 161 and the hole 151i of the base 151. The attaching portion 147b is abutted against a peripheral edge of the hole 161h of the pawl 161.

An outer diameter of the cylindrical portion 147a is set to be slightly smaller than the diameter of the hole 161h of the pawl 161 and the diameter of the hole 151i of the base 151. The cylindrical portion 147a is inserted through the hole 151i of the base 151 and projected to the back surface of the base 151. A leading end of the cylindrical portion 147a is crimped at the back surface of the base 151. The pawl 161 is rotatable relative to the base 151.

The hook 157 is formed with a groove 157a into which the striker 153 is capable of entering and which has planar opposite wall surfaces. Further, on a peripheral portion of the hook 157, a first convex portion 157b and a second convex portion 157c are formed along a rotation direction of the hook 157 into the unlocked position. A concave portion 157d is formed between the first convex portion 157b and the second convex portion 157c. The concave portion 157d is formed such that a width (w: see FIG. 1) is gradually thinned toward the inside from a peripheral surface.

A convex portion 161a is formed on a surface of the pawl 161 facing the hook 157. The convex portion 161a is able to be locked/unlocked from the concave portion 157d of the hook 157. Further, a concave portion 161b is formed on a surface of the pawl 161 facing the hook 157. The second convex portion 157c of the hook 157 is capable of entering the concave portion 161b.

Now, the shapes of the concave portion 157d of the hook 157 and the convex portion 161a of the pawl 161 are described.

As shown in FIG. 3, a first stopper surface 157s and a second stopper surface 157u are formed on the concave portion 157d of the hook 157. The first stopper surface 157s is parallel to a rotation axis of the hook 157 and intersects with a rotation direction (a direction of an arrow UL and a direction opposite to the direction of the arrow UL in FIG. 3) of the hook 157. The second stopper surface 157u faces the first stopper surface 157s via a space. The first stopper surface 157s and the second stopper surface 157u are planar surfaces.

As shown in FIG. 3, a first contact portion 161s and a second contact portion 161u are formed on the convex portion 161a of the pawl 161. The first contact portion 161s is capable of abutting against the first stopper surface 157s of the concave portion 157d. The second contact portion 161u is capable of abutting against the second stopper surface 157u.

As shown in FIG. 2, a protrusion 157t is formed on a surface of the first convex portion 157b of the hook 157 facing the striker-contact member 201. Further, an elongated hole 201a having a track shape is formed on the striker-contact member 201 and engaged with the protrusion 157t of the hook 157.

A major-axis direction of the elongated hole 201a is set to be the same as a major-axis direction of the elongated hole 201h described above. Therefore, the striker-contact member 201 and the hook 157 are integrated and are capable of rotating about the bushing 145 as a rotation center. The striker-contact member 201 are movable linearly with respect to the hook 157 only along the major-axis direction of the elongated hole 201h and the elongated hole 201a.

Here, a guide mechanism for linearly guiding the striker-contact member 201 is configured by the bushing 145 that is a rotation axis of the hook 157, the elongated hole 201h of the striker-contact member 201, into which the bushing 145 is fitted, the protrusion 157t of the hook 157, and the elongated hole 201a of the striker-contact member 201, into which the protrusion 157t of the hook is fitted.

As shown in FIG. 4, the striker-contact member 201 is formed with a groove 201b into which the striker 153 is capable of entering and which has two planar wall surfaces opposing to each other. The hook 157 and the striker-contact member 201 are overlapped in such a way that the groove 157a of the hook 157 and the groove 201b of the striker-contact member 201 are overlapped, as seen from the rotation axis direction of the hook 157. The major-axis direction of the elongated hole 201h and the elongated hole 201a is set to be equal to the extension direction of the groove 157a of the hook 157 and the groove 201b of the striker-contact member 201.

In the state where the hook 157 and the striker-contact member 201 are overlapped, a distance from the center of the elongated hole 201h to the center in the longitudinal direction of the groove 157a of the hook 157 is shorter than a distance from the center of the elongated hole 201h to the center of the elongated hole 201a. Thereby, the striker 153 is abutted against the groove 157a positioned between two support points of the elongated hole 201h and the elongated hole 201a when the striker 153 is abutted against the groove 157a. In this way, the striker 153 is securely supported.

As shown in FIGS. 1 and 2, a spring (spiral spring: hook urging member) 171 is provided between the base 151 and the striker-contact member 201. An inner end of the spring 171 is locked to a first protrusion 151b of the base 151, and an outer end thereof is locked to a protrusion 201e of the striker-contact member 201. Further, the spring 171 urges the hook 157 in the unlocked position direction (direction of the arrow UL in FIG. 4) via the striker-contact member 201.

Further, a spring (spiral spring: pawl urging member) 173 is provided between the base 151 and the pawl 161. An inner end of the spring 173 is locked to a fourth protrusion 151e of the base 151 and an outer end thereof is locked to a protrusion 161e of the pawl 161. Further, the spring 173 urges the pawl 161 in a direction in which the pawl is engaged with the hook 157 (direction of an arrow E in FIG. 4).

As shown in FIGS. 1 and 2, a protrusion 151t is formed on the front surface of the base 151. The protrusion 151t extends in a direction intersecting with the major-axis direction of the elongated holes 201h, 201a of the striker-contact member 201 immediately before being shifted to the locked state from the unlocked state.

The striker-contact member 201 is formed with a stopper protrusion 201s capable of abutting against a stopper surface (upright wall surface) 151s of the protrusion 151t. As shown in FIG. 4, the stopper surface 151s of the protrusion 151t provided in the base 151 has an arcuate surface portion 151u and a planar surface portion 151v provided continuously to the arcuate surface portion 151u.

The arcuate surface portion 151u of the present embodiment is an arcuate surface centered on the rotation center axis of the hook 157. As can be seen from the positional relationship between the elongated hole 201a of the striker-contact member 201 and the protrusion 157t of the hook 157 in FIG. 4, the arcuate surface portion 151u holds the striker-contact member 201 at a position most distant from the pawl 161 when the stopper protrusion 201s of the striker-contact member 201 is abutted against the arcuate surface portion 151u. The arcuate surface portion 151u functions when the hook 157 is located between an unlocked position state and an intermediate state between an unlocked position and a locked position.

In the present embodiment, as can be seen from the positional relationship between the elongated hole 201a of the striker-contact member 201 and the protrusion 157t of the hook 157 in FIG. 6, the planar surface portion 151v holds the striker-contact member 201 at a position displaced to the direction of the pawl 161 from the state of the arcuate surface portion 151u when the stopper protrusion 201s of the striker-contact member 201 is abutted against the planar surface portion 151v. The planar surface portion 151v functions when the hook 157 is located between the intermediate state between the unlocked position and the locked position, and a state immediately before the locked position.

A stopper mechanism is configured by the stopper surface 151s of the protrusion 151t of the base 151 and the stopper protrusion 201s of the striker-contact member 201. The stopper mechanism restricts the movement of the striker-contact member 201 in a direction to be abutted against the striker 153 when the hook 157 is located between the unlocked position and a position other than the locked position.

In addition, the planar surface portion 151v may restrict the movement of the striker-contact member 201 in a direction to be abutted against the striker 153 until immediately before the hook 157 rotating in the locked position direction reaches the locked position. Alternatively, the planar surface portion 151v may release the movement restriction of the striker-contact member 201 in the direction to be abutted against the striker 153 immediately after the hook 157 rotating in the locked position direction goes beyond the intermediate state between the unlocked position and the locked position.

Next, an operation of the configuration described above is described.

(Operation from Unlocked State to Locked State)

When the hook 157 is in the unlocked state shown in FIG. 4, the protrusion 157g (see FIG. 2) of the hook 157 that is urged in the unlock direction by the urging force of the spring 171 is abutted against the bent protrusion 151g (see FIGS. 1 and 2) of the base 151, and further rotational movement of the hook 157 in the unlock direction is prevented. In this state, the stopper protrusion 201s of the striker-contact member 201 is abutted against the stopper surface 151s of the protrusion 151t of the base 151. More specifically, the stopper protrusion 201s is abutted against the arcuate surface portion 151u of the stopper surface 151s, and the striker-contact member 201 is positioned at a position most distant from the pawl 161. Meanwhile, the portion of the pawl 161, which is close to the rotation center than the concave portion 161b, is abutted against the first protrusion 157b of the hook 157 by the urging force of the spring 173.

When a surface 157n in the vicinity of an opening of the groove 157a of the hook 157 is pressed by the striker 153, the hook 157 is rotated in the locked position direction against the urging force of the spring 171, as shown in FIG. 5.

Furthermore, when the hook 157 is rotated in the locked position direction, as shown in FIG. 6, the stopper protrusion 201s of the striker-contact member 201 moves to the planar surface portion 151v from the arcuate surface portion 151u of the stopper surface 151s of the protrusion 151t. Accordingly, the striker-contact member 201 is linearly moved to the direction of the pawl 161 until the planar wall surface of the groove 201b is abutted against the striker 153.

When the hook 157 is rotated to the locked position, as shown in FIG. 7, the concave portion 157d of the hook 157 is engaged with the convex portion 161a of the pawl 161 and the hook 157 is prevented from rotating in the unlock direction. In this way, the striker 153 is locked in the state where the striker cannot be detached from the groove 157a of the hook 157.

At this time, the stopper protrusion 201s of the striker-contact member 201 is detached from the stopper surface 151s of the protrusion 151t immediately before the hook 157 reaches the locked position. Then, a wall surface of the groove 201b of the striker-contact member 201 urged by the spring 171 is abutted against the striker 153 and sandwiches the striker 153 in cooperation with the wall surface of the groove 157a of the hook 157. In this way, the rattling between the striker 153 and the groove 157a of the hook 157 is eliminated.

(Operation from Locked State to Unlocked State)

In order to unlock the pawl in the locked state shown in FIG. 7, the pawl 161 is rotated in a direction opposite to the direction of the arrow E against the urging force of the spring 173. Then, the pawl 161 is detached from the hook 157, the engagement between the concave portion 157d of the hook 157 and the convex portion 161a of the pawl 161 is released, and the hook 157 is rotated in the unlocked position direction by the urging force of the spring 171. Via the state shown in FIGS. 6 and 5, the striker 153 as shown in FIG. 4 becomes the unlocked state where the striker is able to be detached from the groove 157a of the hook 157.

According to the above configuration, the following effects can be achieved.

(1) The spring 171 urges the hook 157 in the unlocked position direction via the striker-contact member 201.

Therefore, it is sufficient that an unlocking operating force resists an urging force of the spring 173 that urges the pawl 161. As a result, an operating force at the time of unlocking the locked state is reduced.

(2) The spring 171 urges the hook 157 in the unlocked position direction via the striker-contact member 201.

Therefore, a spring for urging the striker-contact member 201 is not necessary, and thus it is possible to reduce the number of parts.

(3) Since the striker-contact member 201 is linearly moved and the planar wall surface of the groove 201b is abutted against the striker 153, the striker-contact member 201 does not bite into the striker 153. Therefore, it is sufficient that an unlocking operating force resists an urging force of the spring 173 that urges the pawl 161. As a result, an operating force at the time of unlocking the locked state is reduced.

It is noted that the present invention is not limited to the above embodiments. The following modifications may be realized.

(1) In the above embodiment, the protrusion 151t having the stopper surface 151s is provided in the base 151, and the stopper protrusion 201s capable of abutting against the stopper surface 151s is provided in the striker-contact member 201. However, on the contrary, a protrusion having a stopper surface may be provided in the striker-contact member 201 and a stopper protrusion capable of abutting against the stopper surface may be provided in the base 151.

(2) In the above embodiment, the concave portion 157d is formed in the hook 157 and the convex portion 161a is formed in the pawl 161. However, on the contrary, a convex portion may be formed in the hook 157 and a concave portion may be formed in the pawl 161.

(3) The stopper surface 151s may be provided on the side of the pawl 161, instead of the base 151.

(4) The striker-contact member 201 of the above embodiment has a shape where the elongated hole 201h through which the bushing 145 is inserted is provided and where the busing 145 is inserted through. However, the striker-contact member 201 may have a shape which does not interfere with the bushing 145.

(5) In the above embodiment, two springs of the spring 171 for urging the striker-contact member 201 and the spring 173 for urging the pawl 161 are used. However, one spring may be used whose one end is locked to the striker-contact member 201 and the other end is locked to the pawl 161.

A rubber stopper for damping the collision of the striker 153 may be provided in the bottom of the groove 151a of the base 151. For example, the rubber stopper may be attached to the groove 151a. Alternatively, a sheet-like rubber stopper may be attached to the front surface or back surface of the base 151 such that a portion thereof is projected from the groove 151a.

The present application is based upon Japanese Patent Application (Patent Application No. 2013-045004) filed on Mar. 7, 2013, the contents of which are incorporated herein by reference.

INDUSTRIAL APPLICABILITY

According to the present invention, there is provided a locking device in which an operating force at the time of unlocking the locked state is reduced and which has a good operability.

REFERENCE NUMERALS LIST

151 Base
153 Striker
157 Hook
157a Groove
161 Pawl
171, 173 Spring
201 Striker-Contact Member

What is claimed is:
1. A locking device comprising:
a base;
a hook, which is provided on the base, is formed with a groove into which a striker is capable of entering, and is capable of rotating from an unlocked position, in which the striker is capable of entering the groove, to a locked position, in which the striker is prohibited from being removed from the groove;
a pawl, which is rotatably provided on the base, is configured to prohibit a rotation of the hook out of the locked position by being engaged with the hook when the hook is in the locked position, and is urged in a direction to be engaged with the hook;
a striker-contact member, which is provided on the hook, wherein, when the striker has entered the groove of the hook, the striker-contact member is abutted against one side of the striker and the groove of the hook is abutted against another side of the striker;
an urging member, which urges the hook towards the unlocked position via the striker-contact member and urges the striker-contact member in a liner direction to be abutted against the one side of the striker when the striker has entered the groove; and
a pawl urging member, one end of which is attached to the pawl and another end of which is attached to the base, wherein the pawl urging member urges the pawl in the direction to be engaged with the hook,
wherein one end of the urging member is attached to the striker-contact member, and another end of the urging member is attached to the base,
wherein the striker-contact member is rotatable and is linearly movable in the linear direction with respect to the hook, and
wherein the linear direction, in which the striker-contact member is movable, is a direction intersecting an entering direction, in which the striker moves as it enters into a groove of the base and enters into the groove of the hook.

2. The locking device according to claim 1, further comprising
a stopper mechanism, which restricts a movement of the striker-contact member in the direction to be abutted against the one side of the striker when the hook is located between the unlocked position and a position other than the locked position.

3. The locking device according to claim 2, wherein the stopper mechanism is configured by:
a first stopper protrusion provided on the base; and
a second stopper protrusion provided on the striker-contact member.

4. The locking device according to claim 2, wherein the stopper mechanism includes:
a stopper protrusion provided on one of the base and the striker-contact member; and
a stopper surface provided on the other of the base and the striker-contact member,
wherein the stopper protrusion abuts against the stopper surface when the hook is located between the unlocked position and the position other than the locked position.

5. The locking device according to claim 4, wherein the stopper surface includes an arcuate surface portion and a planar surface portion provided continuously to the arcuate surface portion.

6. The locking device according to claim 5, wherein the arcuate surface portion is centered on a rotation center axis of the hook, and
wherein the planar surface portion holds the striker-contact member at a position when the hook is in the unlocked position.

7. The locking device according to claim 1, wherein the hook is provided with a concave portion that includes a first stopper surface parallel to a rotation axis of the hook and intersecting with a rotation direction of the hook, and a second stopper surface facing the first stopper surface via a space,
wherein the pawl is provided with a convex portion that includes a first contact portion capable of abutting against the first stopper surface and a second contact portion capable of abutting against the second stopper surface, and
wherein an engagement between the hook and the pawl is made by the concave portion and the convex portion.

8. The locking device according to claim 1, wherein the striker-contact member is positioned between the base and the hook.

9. The locking device according to claim 1, wherein the urging member is positioned between the striker-contact member and the base.

10. The locking device according to claim 1, wherein, when the hook and the pawl are engaged with each other when the hook is in the locked position, rotations in a clockwise direction and a counterclockwise direction of the hook are prohibited.

11. The locking device according to claim 1, wherein a protrusion is formed on the hook,
   wherein a guide mechanism guides the striker-contact member to move along the linear direction and the guide mechanism comprises the protrusion of the hook, a first guide portion, which corresponds to the protrusion, of the striker-contact member, and an axis member, which is provided on the base as a rotation axis of the book.

12. The locking device according to claim 11, wherein the guide mechanism further comprises a second guide portion, which is provided on the striker-contact member and corresponds to the axis member.

* * * * *